(12) United States Patent
Dodds et al.

(10) Patent No.: US 6,886,181 B1
(45) Date of Patent: Apr. 26, 2005

(54) EXTENDED DISTRIBUTION OF ADSL SIGNALS

(75) Inventors: David E. Dodds, Saskatoon (CA); Oliver Cruder, Saskatoon (CA); Mark Labbe, Saskatoon (CA)

(73) Assignee: Critical Telecom Corp., Kanata (CA)

( * ) Notice: Subject to any disclaimer, the term of this patent is extended or adjusted under 35 U.S.C. 154(b) by 645 days.

(21) Appl. No.: 09/612,445

(22) Filed: Jul. 7, 2000

(51) Int. Cl.[7] .............................................. H04N 7/173

(52) U.S. Cl. ..................... 725/119; 725/118; 725/106; 725/120; 725/121; 725/127; 725/129; 370/352; 370/389; 370/395

(58) Field of Search ................................ 725/106, 118, 725/119–122, 127, 129; 370/352–354, 395, 401, 486, 487, 493, 498

(56) References Cited

U.S. PATENT DOCUMENTS

| | | | |
|---|---|---|---|
| 4,891,694 A | | 1/1990 | Way |
| 4,907,218 A | * | 3/1990 | Inoue et al. ................. 370/201 |
| 5,177,604 A | * | 1/1993 | Martinez .................... 725/144 |
| 5,303,229 A | | 4/1994 | Withers et al. |
| 5,408,260 A | | 4/1995 | Arnon |
| 5,767,895 A | | 6/1998 | Yashiro et al. |
| 5,815,794 A | * | 9/1998 | Williams .................... 725/125 |
| 5,917,624 A | | 6/1999 | Wagner |
| 5,940,738 A | | 8/1999 | Rao |
| 6,005,873 A | * | 12/1999 | Amit ........................... 370/494 |
| 6,166,895 A | * | 12/2000 | Dziedzic .................... 361/119 |
| 6,188,871 B1 | * | 2/2001 | Kitamura et al. ........... 725/120 |
| 6,189,008 B1 | * | 2/2001 | Easty et al. .................... 707/10 |
| 6,208,637 B1 | * | 3/2001 | Eames ......................... 370/352 |
| 6,278,778 B1 | * | 8/2001 | Abdollahi et al. ..... 379/373.01 |
| 6,282,189 B1 | * | 8/2001 | Eames ......................... 370/352 |
| 6,310,894 B1 | * | 10/2001 | Counterman ................ 370/484 |
| 6,353,611 B1 | * | 3/2002 | Norris et al. ................ 370/356 |
| 6,404,774 B1 | * | 6/2002 | Jenness ....................... 370/465 |
| 6,408,004 B1 | * | 6/2002 | Wetzel et al. ............. 370/395.6 |
| 6,418,558 B1 | * | 7/2002 | Roberts et al. ............. 725/129 |

(Continued)

OTHER PUBLICATIONS

"Multicarrier Modulation for Data Transmission: An Idea Whose Time Has Come" by John A. C. Bingham, IEEE Communications Magazine, vol. 28, No: 5 pp. 5–14–May 1990.

*Primary Examiner*—John Miller
*Assistant Examiner*—Annan Shang
(74) *Attorney, Agent, or Firm*—Adrian D. Battison; Michael R. Williams; Ryan W. Dupuis

(57) ABSTRACT

A plurality of metallic telephone lines carrying both baseband POTS (plain old telephone service) and DSL (digital subscriber line) or ADSL (asymmetric digital subscriber line) signals originate at customer premises and pass through a common field cabinet enroute to a telephone central office. Baseband POTS signals flow in an undisturbed manner through the field cabinet and maintain the normal, highly reliable, communication between the subscriber premises and the central office telephone switch. At the field cabinet, DSL/ADSL signals are removed from the metallic telephone line and are then communicated between the field cabinet and the central office using fiber optic broadband transmission. Fiber optic transmission increases the allowed distance between the ADSL transceiver located at the customer location and the respective ADSL transceiver located in the telephone central office. In the optical fiber, DSL and ADSL signals are retained in their 2B1Q, DMT, QAM or CAP analog format and are simply frequency translated in the process of frequency division multiplex (FDM) transmission. The arrangement allows the provision of ADSL service to customers beyond the distance limit normally imposed by a completely metallic telephone line. It is understood that this arrangement is equally applicable to a variety of DSL (digital subscriber line) signals.

21 Claims, 3 Drawing Sheets

U.S. PATENT DOCUMENTS

| | | | |
|---|---|---|---|
| 6,430,199 B1 * | 8/2002 | Kerpez | 370/493 |
| 6,442,195 B1 * | 8/2002 | Liu et al. | 375/220 |
| 6,625,777 B1 * | 9/2003 | Levin et al. | 714/774 |
| 6,628,783 B1 * | 9/2003 | Van Wonterghem | 379/416 |
| 6,687,231 B1 * | 2/2004 | Czerwiec et al. | 370/244 |
| 6,690,718 B1 * | 2/2004 | Kim | 375/222 |
| 6,738,474 B1 * | 5/2004 | Miller | 379/413.03 |
| 6,744,883 B1 * | 6/2004 | Bingel et al. | 379/399.01 |
| 2003/0152105 A1 * | 8/2003 | Arimilli | 370/468 |

* cited by examiner

EXTENDED DISTRIBUTION OF ADSL SIGNALS

This invention relates to an apparatus for distributing ADSL signals to customer premises from a central office and to a splitter and interface module for use therein.

BACKGROUND OF THE INVENTION

The use of the term ADSL herein is intended to include other forms of DSL signals which are available to one skilled in the art including HDSL, SDSL and VHDSL signals. Also the various forms of ADSL signals can be used such as DMT, QAM or CAP analog format.

The following U.S. patent references have been noted in a search:

- U.S. Pat. No. 5,303,229 (Withers et al.) issued 12 Apr. 1994 entitled Optical Network Unit.
- U.S. Pat. No. 5,408,260 (Arnon) issued 18 Apr. 1995 entitled Customer premises ADSL signal distribution arrangement.
- U.S. Pat. No. 5,767,895 (Yashiro and Sasada) issued 16 Jun. 1998 entitled CATV Telephone System.
- U.S. Pat. No. 4,891,694 (Way) issued 2 Jan. 1990 entitled Fiber optic cable television distribution system.
- U.S. Pat. No. 5,917,624 (Wagner) issued 29 Jun. 1999 entitled Method and system for applying fiber to the curb architecture using a broadband gateway at service locations, including homes.
- U.S. Pat. No. 5,940,738 (Rao) issued 17 Aug. 1999 entitled Video pedestal network.

With the widespread utilization of the Internet, it has been recognized that there is a demand for various forms of information to be communicated to and from customer premises such as residences. This information includes, in particular telephone service, security and metering services, Internet access and digital video-on-demand services. Internet access and specifically video-on-demand require very high data rates.

Optical fiber networks have the capability of meeting this demand, but do not generally extend to residential customer premises. Telephone subscriber lines extend to residential customer premises but have insufficient bandwidth to carry video signals until the recent development of digital video and DSL (digital subscriber line) technology.

Two technologies, namely cable TV modems, and ADSL (asymmetric digital subscriber line) systems, have been developed for delivering Internet services and bi-directional communications services to customer premises. Both technologies make use of existing wiring to the subscriber location and existing wiring within the customer premises and require, at most, minimal rewiring. Both technologies continue to support existing customer equipment and services.

ADSL typically provides a high data rate channel for transmission in a downstream direction from a telephone CO (central office) to a subscriber, a somewhat lower data rate channel for upstream transmission in addition to POTS (plain old telephone service), via a two-wire telephone subscriber line. Thus this technology can simultaneously communicate Internet data at as well as telephone signals bi-directionally, over a single telephone subscriber line which is referred to as an ADSL loop. ADSL technology, for example the type using multi-carrier modulation, makes it possible to send data at bit rates in excess of 6 Mb/s downstream on telephone subscriber lines.

The principles of multi-carrier modulation are described for example in "Multi-carrier Modulation For Data Transmission: An Idea Whose Time Has Come" by John A. C. Bingham, IEEE Communications Magazine, Vol. 28, No. 5, pages 5–14, May 1990.

A significant problem in the widespread adoption of ADSL technology is the limited range of transmission. Practical limitations are 4 km from the CO for 1.5 Mb/s service and 2 km from the CO for 6 MB/s service. The telephone operating companies are unable to offer ADSL to many of their customers since the serving radius of each central office exchange is typically up to 5.5 km.

One solution to this problem is to shorten the ADSL loop by providing remote extensions to the telephone central office known as remote line units or RAM (remote access modules). Within these units, is provided a DSLAM (digital subscriber access multiplexer) that includes the ADSL modem that is normally located at the CO. The DSLAM digitally multiplexes the data from several ADSL loops and provides and interface to a high-speed digital channel connecting to the CO and typically implemented with SONET transmission on optical fiber.

Unfortunately, the RAM contains relatively bulky equipment that requires power and environmental control. The required enclosure is costly since it must be sized for future service growth and this cost is excessive when the RAM serves only a small number of ADSL customers. Furthermore, the extension of CO equipment into remote access modules requires the deployment of highly skilled service personnel who were previously required only in the CO.

SUMMARY OF THE INVENTION

It is an object of this invention, therefore, is to provide a more advantageous arrangement for distributing ADSL signals to and from customer premises and to extend the distribution area of ADSL signals.

It has been observed that telephone subscriber loop installations make use of passive field cabinets for the purpose of patch connections between distribution cables that connect to residential or business units and trunk cables that connect to the CO. A representative field cabinet provides patch connections for approximately 450 residential and business units.

This invention utilizes well-established analog transmission equipment to transport ADSL signals from the field cabinet to the CO. For extended distribution of ADSL signals, this eliminates the requirement to place DSLAM equipment in modules that are remote from the CO.

According to a first aspect of the invention therefore there is provided an apparatus for distributing ADSL signals to customer premises from a central office, comprising:

a central office having a POTS switching system and ADSL terminals that connect to a data network;

a plurality of customer locations at least some of which have at least one voice frequency POTS terminal and at least one ADSL terminal;

a field cabinet associated with the plurality of customers;

a plurality of individual metallic telephone lines each extending from a respective one of the customers to the field cabinet;

a trunk cable containing a large number of metallic telephone lines and extending from the field cabinet to the central office;

the field cabinet including a plurality of connections for connecting the individual telephone lines to the trunk cable for connection of signals between the customer locations and the central office;

the individual metallic telephone lines each being arranged to transmit both voice frequency POTS signals and ADSL signals between the respective customer location and the field cabinet;

a bi-directional link separate from the trunk cable for the broadband transmission of analog signals in pre-selected frequency bands between the central office and the field cabinet;

a splitter and interface module at the field cabinet having:

a plurality of signal splitting coupler units each associated with a respective one of the individual telephone lines and each arranged to separate the ADSL signals and the voice frequency POTS signals from the respective telephone line;

a plurality of connectors each arranged to connect the separated voice frequency POTS signals between the respective individual telephone line and the trunk cable;

a plurality of interface and frequency translation units each associated with a respective one of the coupler units for receiving the separated ADSL signals from the coupler unit and for communicating the bi-directional ADSL signals on the bi-directional link between the central office and the respective individual telephone line in a pre-selected one or more of the frequency bands that are associated with the respective individual telephone line; and a plurality of frequency translation and interface units at the telephone central office each of which is associated with the pre-selected band or bands on the bi-directional link associated with a respective individual telephone line and each of which provides an interface between the respective ADSL signals on the bi-directional link and the ADSL terminal of the central office.

Preferably the signal splitting coupler includes a filter that couples to the connectors substantially only voice frequency signals in the frequency band below 4 kHz and couples to the interface and frequency translation units substantially only signals in the frequency range above 20 kHz. However other schemes which avoid the use of a filter are also possible.

Preferably the bi-directional link includes a fiber optic link between the field cabinet and the central office, an optical transceiver at the field cabinet and a second optical transceiver at the central office. However the link can also be provided by other known transmission systems which avoid the degradation of the signals including coaxial cable, wireless and microwave systems. The link is a dedicated link unrelated to any local communication systems for cable or the like. The bi-directional link is normally provided by two unidirectional links in the case of fiber optic transmission, the bi-directional communication on the same fiber can be effected by use of two different optical wavelengths. In the case of co-axial cable or CATV transmission, the bi-directional communication on the same cable can be effected by use of two different frequency bands.

Preferably the link includes two unidirectional fiber optic links and wherein the interface and frequency translation units each contain a directional hybrid coupler to interface the bi-directional metallic telephone line to the two unidirectional fiber optic links.

Preferably the fiber optic link includes a fiber optic cable and a metallic conductor pair for supplying power from the central office to the interface and frequency translation units. However other techniques for supplying power can be used including, but not preferably, supply from a local power utility source.

Preferably the frequency translators are arranged such that the frequency bands are each located within a respective 6 MHz frequency band communicated on the bi-directional link.

Preferably each frequency translator from the ADSL signals to the frequency band includes a CATV modulator arranged to locate the respective ADSL signals within a respective video channel frequency band which is then communicated on the bi-directional link. Such modulators are used because they are readily commercially available but other schemes can also be used.

Preferably each frequency translator includes a first translator element arranged to translate to an intermediate frequency by double side band transmitted carrier amplitude modulation (AM-DSB-TC) of a radio frequency carrier at the intermediate frequency and wherein the CATV modulator is arranged to translate from the intermediate frequency to the respective video channel frequency band.

Preferably the first translator element is arranged to effect direct translation from the ADSL signals to the pre-selected frequency band by AM-DSB-TC modulation of a radio frequency carrier.

Preferably each frequency translator includes a first tuner element arranged to translate from the pre-selected frequency band to the intermediate frequency band and the tuner to be followed by envelope detection of the AM-DSB-TC signal so as to translate the signal from the intermediate frequency band to the ADSL signal band on the metallic telephone line.

In an alternative arrangement, the bi-directional link includes a co-axial cable link.

In this case, the means in each frequency translator communicating the bi-directional ADSL signals via the coaxial cable comprises at least one transmitter and at least one receiver arranged to transmit and receive the bi-directional signals at respective frequencies.

In this case, the frequency translator at the telephone central office is tuned to transmit signals at a respective frequency in a first frequency band for a downstream transmission direction on the coaxial cable, and the said frequency translator at field cabinet is tuned to transmit signals at a respective frequency in a second frequency band for an upstream transmission direction on the coaxial cable.

According to a second aspect of the invention there is provided a splitter and interface module for use in the above apparatus, the splitter and interface module at the field cabinet comprising:

a mounting assembly for mounting on the field cabinet;

a plurality of terminal blocks for connection to the individual telephone lines;

a plurality of signal splitting coupler units each connected to respective connections of the terminal blocks for associated with a respective one of the individual telephone lines and each coupler unit to separate the ADSL signals from the respective individual metallic telephone line;

a plurality of interface and frequency translation units each connected to a respective one of the coupler units for receiving the separated ADSL signals from the coupler unit and for translating the bi-directional ADSL signals to and from a pre-selected one or more of the frequency bands;

and a connector for communicating the ADSL signals in the pre-selected frequency band on the bi-directional link.

BRIEF DESCRIPTION OF THE DRAWINGS

One embodiment of the invention will now be described in conjunction with the accompanying drawings in which.

In the drawings like characters of reference indicate corresponding parts in the different figures.

DETAILED DESCRIPTION

Figure 1:
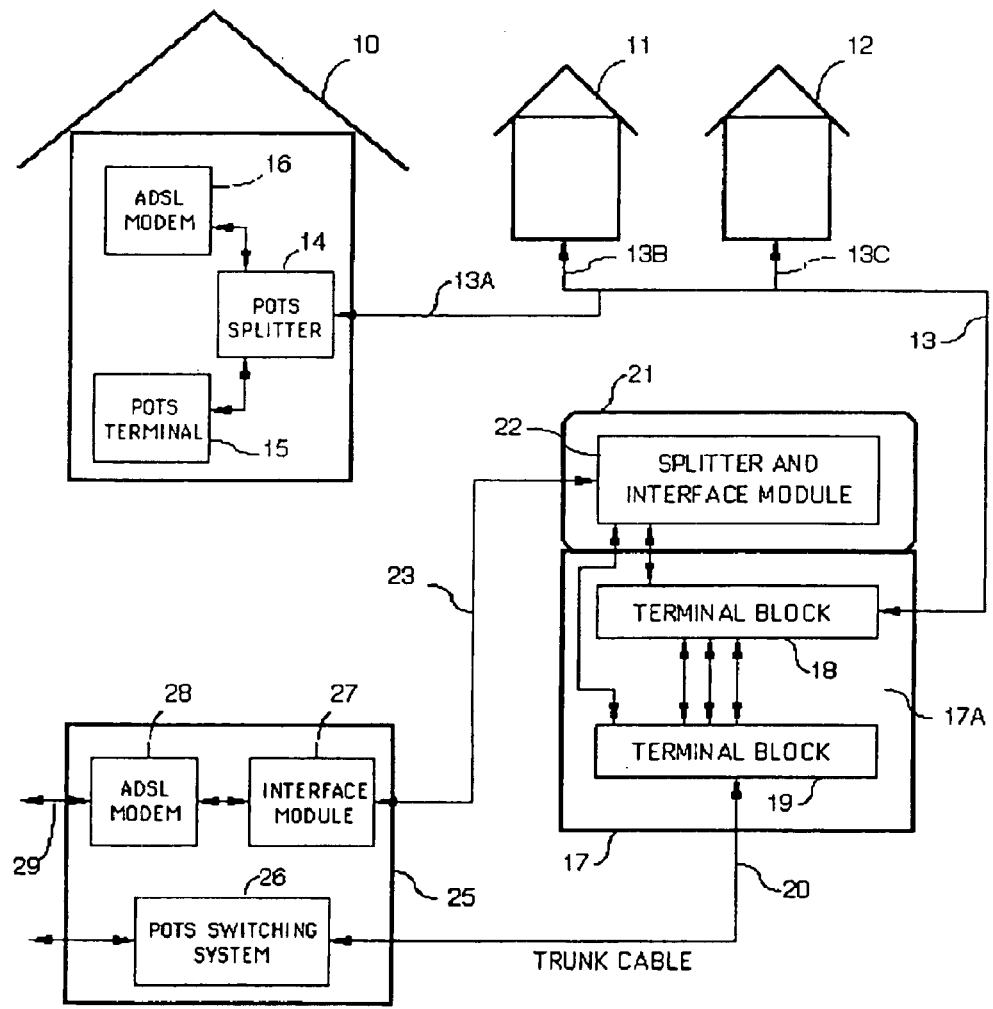
FIG. 1 is a schematic illustration of a distribution system for POTS and ADSL signals according to the present invention.

One example of the distribution network is shown in FIG. 1 in which there is provided a plurality of customer locations indicated at 10, 11 and 12. Some of the customer locations will be of the arrangement shown at 10 wherein an individual metallic telephone line 13A within the distribution cable 13 of the telephone system to the customer location is fed into a splitter 14 which acts to separate the voice frequency POTS signals for supply to a POTS terminal 15 from the ADSL signals to an ADSL modem 16. Thus the customer's concern may have one or more conventional POTS terminals and one or more ADSL modems for communication along the common distribution cable 13. Some of the customer locations simply require the POPS connection and therefore do not include an ADSL modem or the splitter.

The distribution system further includes a field cabinet 17 which conventionally comprises a first portion 17A which simply is a passive construction including terminal connectors 18 an 19 by which the distribution cables 13 are connected to a terminal block 18 and a trunk cable 20 is connected to a second terminal block 19 with jumpers connected to the two terminal blocks to provide the required connections from a trunk cable to the individual subscriber locations.

In the present invention the field cabinet is supplemented by an additional housing 21 which contains a splitter and interface module 22. This module is provided for the use of the ADSL customers and is used to separate the signals of those ADSL customers into the separate module from which the POTS signals are separated from the ADSL signals for communication of the POTS signals along the conventional trunk cable 20 while ADSL signals are transmitted through an additional bi-directional link 23. Both the bi-directional link 23 and the trunk cable 20 communicate with the central office 25 as separate communication links so that the POTS signals on the trunk cable 20 are communicated to a POTS switching system 26 and the ADSL signals on the link 23 are communicated through an interface module 27 to an ADSL modem 28 connecting to a network 29.

Figure 2:
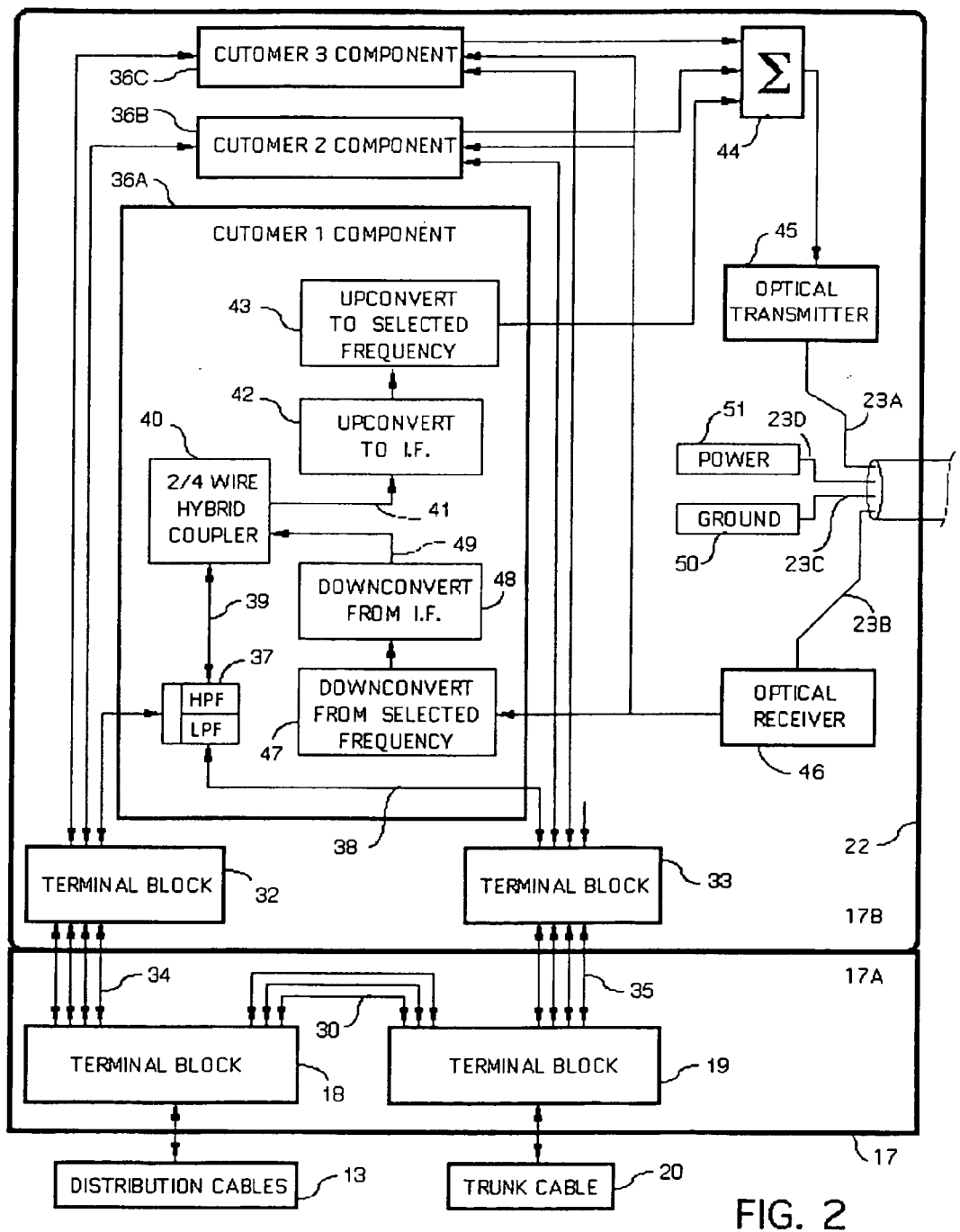
FIG. 2 is a schematic illustration of the field cabinet of FIG. 1 including the splitter and interface module mounted therein.

Turning now to FIG. 2, the field cabinet 17 is shown in more detail and includes the terminal blocks 18 and 19 within the conventional housing section 17A with some connections 30 extending directly between the blocks 18 and 19 for customers who do not require ADSL services.

On top of or at one side of the conventional field cabinet 17 is provided an additional housing 17B. This contains the module 22, the structure of which is shown in FIG. 2 and includes two terminal blocks 32 and 33 by which jumpers 34 and 35 can be connected to the blocks 18 and 19 respectively. Thus the signals containing both the POTS and ADSL signals to and from the distribution cables 13 for the ADSL customers are connected to the terminal block 32 separately for each of the individual customers along a separate jumper connection 34.

For each customer, the module contains a separate splitter and interface module component 36A, 36B, 36C et seq. Each of the components 36A, 36B, 36C contains for each customer the same functions so that only one of the interface components 36A is shown in detail. This includes a high pass/low pass filter 37 which is arranged to separate the POTS signals from the ADSL signals. Examples of splitters of this type are shown in U.S. Pat. Nos. 5,528,630 and 5,627,501 and are well known to one skilled in the art. The details of the above patents are therefore incorporated herein by reference as examples of splitters which can be used for the splitter arrangement 37.

The POTS signals from the low pass filter component are communicated through a connection 38 to the terminal block 33 and then are supplied through a respective of one jumpers 35 to the respective location on the terminal block 19 thus reconnecting the POTS signals in the same connection that they would normally take from the respective distribution cable 13 to the respective location on the trunk cable 20.

The ADSL signals from the splitter 37 are supplied through a connector 39 to a hybrid coupler 40. Again the coupler 40 which acts as two/four wire coupler is of a conventional nature widely used in this industry and acts to separate the signals on the two wire connection 39 into a four wire connection provided by a first connection 41 and a second connection 49 for upstream and downstream signals respectively. Thus the signals from the customer location are communicated on the line 41 to a frequency translator for communication on the link 23. In the embodiment shown the frequency translator comprises a first component 42 and a second component 43 which combine to translate the ADSL signals into a respective one of the plurality of video channel frequency bands which are available on the link 23. Thus each customer is allocated a specific one of the interface components 36A so that the signals from that customer are communicated only to that component and the customer is also allocated a specific frequency band within the available frequency spectrum. For convenience the frequency bands are selected to be the same as conventional CATV bands which provides a bandwidth of 6 MHz. ADSL signals use a portion of this bandwidth in the range 20 kHz to 1.1 MHz. However the bandwidth may be greater or smaller depending upon requirements and in some case for example in Europe the CATV bandwidth is conventionally 7 to 8 MHz and yet in other cases the band width may be significantly greater to provide enhanced signal communication capability and up to 20 MHz may be required in such circumstances.

In order to make use of commercially available equipment, the frequency translation is effected into two steps using the separate components 42 and 43. Thus the first component 42 converts the signals by a double side band transmitted carrier modulation of a radio frequency carrier at an intermediate frequency which selected to be 45.75 MHz. Thus preferably the signal translation is effected by AM-DSB-TC modulation of the radio frequency carrier. This modulation technique is again well known to one skilled in the art and suitable components are available commercially.

The second component 43 is a conventional commercially available CATV modulator which translates from the intermediate frequency up to the selected band for that particular customer. Such devices are well known to one skilled in the art and are readily commercially available for use in commercial equipment for CATV communications.

The frequency translated ADSL signals from the individual customer components are communicated to a summing point 44 again of a conventional nature. These signals are then transmitted on the link 23.

In the embodiment shown, the link is a fiber optic cable including two unidirectional cable elements so that the signals from the summing point 44 are transmitted to an optical transmitter 45 for transmission along the cable portion 23A to the central station.

In a directly symmetrical manner, the cable portion 23B communicates signals optically from the central station to the module 22 and particularly to an optical receiver 46 of the module. The optical signals are transmitted to the components of the individual customers where the signals from the particular band allocated to that customer are frequency translated back down from the band to provide the ADSL signals for supply to the line 49 to the coupler 40. Thus again the translation is effected in two separate components indicated at 47 and 48 which operate symmetrically to the components 42 and 43 as previously described. The signals from the coupler 40 thus are bi-directionally communicated through the connector 39 and back through the splitter 37 to the customer location through the respective distribution cable 13.

The use of the bi-directional link allows the ADSL signals separated from the POTS signals to be transmitted without appreciable limitation on distance of transmission through the link which is dedicated to the connection between the central station and the particular field cabinet with which the customer's identified are associated.

The module 22 receives power through the fiber optic cable of the link 23 via metallic conductors 23C and 23D which connect to the ground line 50 and to a power line 51 respectively. The ground and power are thus provided to the module and to each of the individual components associated with the respective customers.

Figure 3:
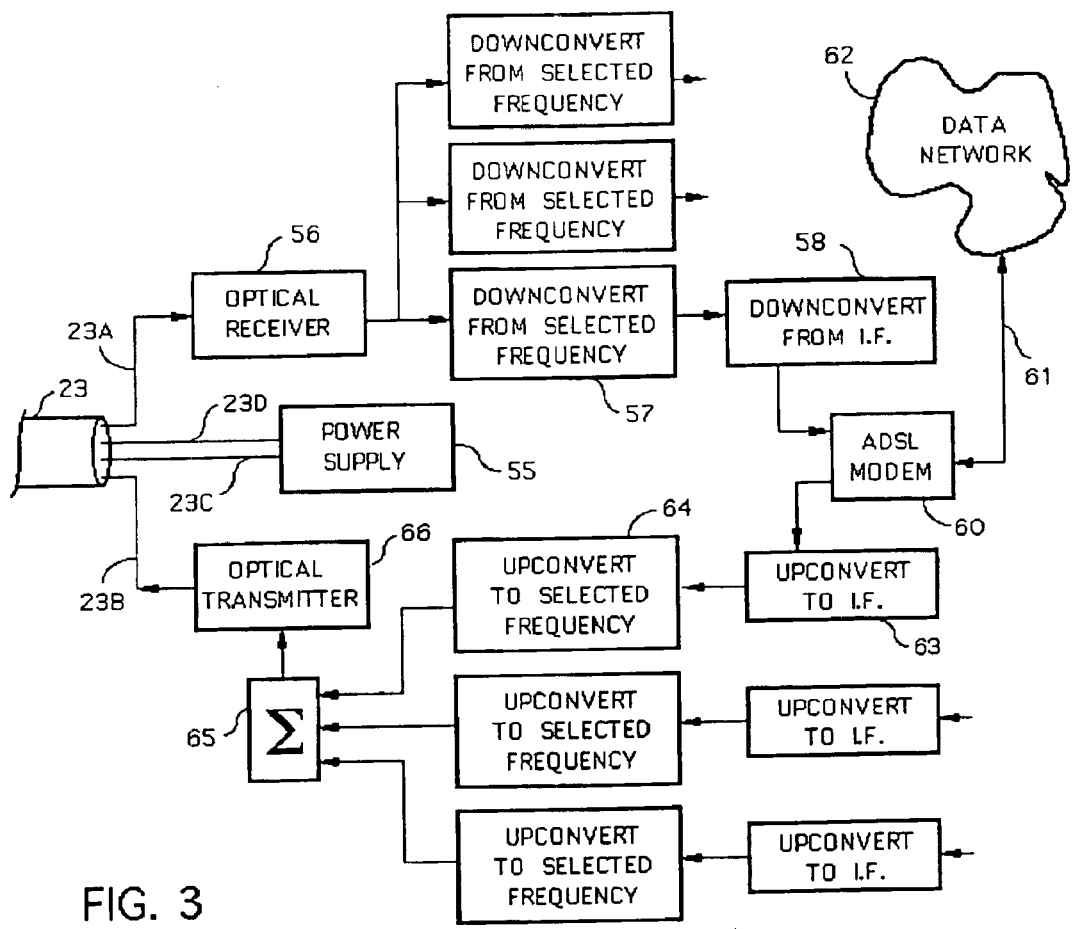
FIG. 3 is a schematic illustration of the additional components at the central office.

Turning now to FIG. 3, at the central station is provided a symmetrical arrangement to the module 22 at the field cabinet. Thus there is provided a power supply 55 for communication of the power and ground to the field cabinet over the metallic conductors 23C and 23D of the link 23. The signals on the unidirectional link 23A are received by an optical receiver 56 and are supplied to a plurality of down converter components 57 each associated with a respective one of the frequency bands and each arranged to converter the frequencies from that band to provide the ADSL signals associated with the respective customer. Again the down conversion is effected in two steps by components 57 and 58 symmetrical to the components 42 and 43 previously described. The ADSL signals of the respective customer are therefore communicated to a respective ADSL modem 60 and through that modem to the data network 62. Similarly return signals from the data network 62 are received by the ADSL modem and communicated through frequency translation components 63 and 64 to the optical transmitter 66.

Thus each of the components set forth above in the module at the field cabinet and in the module at the central station are commercially available components connected and configured to provide the advantages set forth above.

In an arrangement in which the optical fiber connection is replaced by a conventional co-axial cable, a single co-axial cable can be used for communications in both directions and in this case each customer will be allocated a first frequency band for communications in one direction and a second frequency band for communications in the opposite direction.

An advantage of the invention is that no specific signal format is required for transmission of DSL signals and that future DSL signal formats can be accommodated by the proposed structure.

A further advantage of the invention is that a variety of DSL signals can be accommodated at a specific field cabinet. Furthermore, equipment at the CO for a specific type of DSL transmission can service a number of customers that are associated with a diverse variety of field cabinets.

It is required that the signal coupler unit within the field cabinet splitter and interface module does not interrupt "lifeline" POTS service in the event of power failure or equipment failure.

Although it goes against present practice for ADSL installation, it is also possible to tap into the telephone line at the filed cabinet without breaking the existing patch wire. The metallic telephone line would thus not be routed through the signal splitting coupler (or filter) in the splitter/interface module.

Since various modifications can be made in my invention as herein above described, and many apparently widely different embodiments of same made within the spirit and scope of the claims without departing from such spirit and scope, it is intended that all matter contained in the accompanying specification shall be interpreted as illustrative only and not in a limiting sense.

What is claimed is:

1. Apparatus for distributing ADSL signals to customer premises from a central office, comprising:

a central office having a POTS switching system and ADSL terminals that connect to a data network;

a plurality of customer locations at least some of which have at least one voice frequency POTS terminal and at least one ADSL terminal;

a field cabinet remote from the central office associated with the plurality of customers;

a plurality of individual metallic telephone lines each extending from a respective one of the customers to the field cabinet;

a trunk cable containing a large number of metallic telephone lines and extending from the field cabinet to the central office;

the field cabinet including a plurality of connections for connecting the individual telephone lines to the trunk cable for connection of signals between the customer locations and the central office;

the individual metallic telephone lines each being arranged to transmit both voice frequency POTS signals and ADSL signals between the respective customer location and the field cabinet;

a bi-directional link separate from the trunk cable for the broadband transmission of ADSL signals in a modulated analog form in pre-selected frequency bands between the central office and the field cabinet;

the ADSL terminals at the central office including ADSL modems arranged to communicate the ADSL signals in their modulated analog form over the bi-directional link;

a splitter and interface module at the field cabinet, remote from the central office having:

a plurality of signal splitting coupler units each associated with a respective one of the individual telephone lines and each arranged to separate the ADSL signals and the voice frequency POTS signals from the respective telephone line;

a plurality of connectors each arranged to connect the separated voice frequency POTS signals between the respective individual telephone line and the trunk cable;

a plurality of interface and frequency translation units each associated, with a respective one of the coupler units for receiving the separated ADSL signals from the coupler unit and for communicating the bi-directional ADSL signals in their analog form on the bi-directional link between the central office and the respective individual telephone line in a pre-selected one or more of the frequency bands that are associated with the respective individual telephone line; and a plurality of frequency translation and interface units at the telephone central office each of which is associated with the pre-selected band or bands on the bi-directional link associated with a respective individual telephone line and each of which provides an interface between the respective ADSL signals on the bi-directional link and the ADSL modem of the ADSL terminal of the central office.

2. The apparatus according to claim 1 wherein the signal splitting coupler includes a filter that couples to the connectors substantially only voice frequency signals in the frequency band below 4 kHz and couples to the interface and frequency translation units substantially only signals in the frequency range above 20 kHz.

3. The apparatus according to claim 1 wherein the bi-directional link includes a fiber optic link between the field cabinet and the central office, an optical transceiver at the field cabinet and a second optical transceiver at the central office.

4. The apparatus according to claim 3 wherein the fiber optic link includes two unidirectional fiber optic links and wherein the interface and frequency translation units each contain a directional hybrid coupler to interface the bi-directional metallic telephone line to the unidirectional fiber optic link.

5. The apparatus according to claim 3 wherein the fiber optic link includes a fiber optic cable and a metallic conductor pair for supplying power from the central office to the interface and frequency translation units.

6. The apparatus according to claim 1 wherein the frequency translators are arranged such that the frequency bands are each located within a respective 6 MHz frequency band communicated on the bi-directional link.

7. The apparatus according to claim 1 wherein each frequency translator from the ADSL signals to the frequency band includes a CATV modulator arranged to locate the respective ADSL signals within a respective video channel frequency band which is then communicated on the bi-directional link.

8. The apparatus according to claim 7 wherein each frequency translator includes a first translator element arranged to translate to an intermediate frequency by double side band transmitted carrier amplitude modulation (AM-DSB-TC) of a radio frequency carrier at the intermediate frequency and wherein the CATV modulator is arranged to translate from the intermediate frequency to the respective video channel frequency band.

9. The apparatus according to claim 8 wherein the first translator element is arranged to effect direct translation from the ADSL signals to the pre-selected frequency band by AM-DSB-TC modulation of a radio frequency carrier.

10. The apparatus according to claim 8 wherein each frequency translator includes a first tuner element arranged to translate from the pre-selected frequency band to the intermediate frequency band and the tuner to be followed by envelope detection of the AM-DSB-TC signal so as to translate the signal from the intermediate frequency band to the ADSL signal band on the metallic telephone line.

11. The apparatus according to claim 1 wherein the bi-directional link includes a coaxial cable link.

12. The apparatus according to claim 11 wherein the means in each frequency translator communicating the bi-directional ADSL signals via the co-axial cable comprises at least one transmitter and at least one receiver arranged to transmit and receive the bi-directional signals at respective frequencies.

13. The apparatus according to claim 12 wherein said frequency translator at the telephone central office is tuned to transmit signals at a respective frequency in a first frequency band for a downstream transmission direction on the coaxial cable, and the said frequency translator at field cabinet is tuned to transmit signals at a respective frequency in a second frequency band for an upstream transmission direction on the coaxial cable.

14. Apparatus for distributing ADSL signals to customer premises from a central office, comprising:

a central office;

the central office having a POTS switching system;

the central office having ADSL connection terminals that connect to a data network;

a plurality of customer locations at least some of which have at least one voice frequency POTS terminal and at least one ADSL terminal;

a field cabinet remote from the central office associated with the plurality of customer locations;

a plurality of individual metallic telephone lines each extending from a respective one of the customer locations to the field cabinet;

a trunk cable containing a large number of metallic telephone lines and extending from the field cabinet to the central office;

the field cabinet including a plurality of connections for connecting the individual telephone lines to the trunk cable for connection of signals between the customer locations and the central office;

the individual metallic telephone lines each being arranged to transmit both voice frequency POTS signals and ADSL signals between the respective customer location and the field cabinet;

a bi-directional link separate from the trunk cable for the transmission of ADSL signals in a modulated analog form between the field cabinet and the central office for connection to the data network; and the ADSL terminals at the central office including ADSL modems arranged to communicate the ADSL signals in their modulated analog form over the bi-directional link;

a splitter and interface module at the field cabinet, remote from the central office having:

a plurality of signal splitting coupler units each associated with a respective one of the individual telephone lines and each arranged to separate the ADSL signals and the voice frequency POTS signals from the respective telephone line;

a plurality of connectors each arranged to connect the separated voice frequency POTS signals between the respective individual telephone line and the trunk cable; and a plurality of interface units each associated with a respective one of the coupler units for receiving the separated ADSL signals from the coupler unit and for communicating the bi-directional ADSL signals on the bi-directional link between the central office and the respective individual telephone line.

15. The apparatus according to claim 14 wherein the central office includes an interface module arranged to transport the ADSL signals on the bi-directional link in a modulated format intended for transmission on the metallic telephone lines and wherein these the interface module at the central office location is arranged to modulate a high frequency carrier and where this carrier is demodulated at the field cabinet to recover the DSL signal which is then transmitted on the metallic telephone line to the customer location.

16. The apparatus according to claim 15 where the ADSL signal is transported without significant amplitude change.

17. The apparatus according to claim 14 wherein the interface units are arranged such that multiple ADSL signals from respective customer locations are combined to a single broadband signal through the use of frequency division multiplexing.

18. The apparatus according to claim 14 wherein the interface units are arranged such that a plurality of ADSL signals individually modulate a respective plurality of high frequency carriers separated in frequency by an amount that avoids interference between the individual DSL signals.

19. The apparatus according to claim 14 wherein the interface units are arranged such that power failure or failure in the DSL transmission equipment does not impair the POTS service and where.

20. The apparatus according to claim 14 wherein the interface units are arranged such that the DSL signals are not concentrated, as in statistical multiplexing, and that all customers may simultaneously utilize the full ADSL bit rate.

21. The apparatus according to claim 14 wherein the field cabinet receives its power supply from the central office through paired metallic telephone lines including wire pairs that would otherwise be used for voice frequency transmission.

* * * * *